(12) United States Patent
Christensen et al.

(10) Patent No.: US 8,168,765 B2
(45) Date of Patent: May 1, 2012

(54) PROCESS FOR MAKING DE-ESTERIFIED PECTINS THEIR COMPOSITION AND USES THEREOF

(75) Inventors: Steen Hojgaard Christensen, Bronshoj (DK); Karin Meyer Hansen, Herfolge (DK); Jens Eskil Trudso, Roskilde (DK)

(73) Assignee: CP Kelco Aps, Lille Skensved (DK)

( * ) Notice: Subject to any disclaimer, the term of this patent is extended or adjusted under 35 U.S.C. 154(b) by 924 days.

(21) Appl. No.: 10/519,704

(22) PCT Filed: Jul. 2, 2003

(86) PCT No.: PCT/DK03/00461
§ 371 (c)(1),
(2), (4) Date: Dec. 5, 2005

(87) PCT Pub. No.: WO2004/005352
PCT Pub. Date: Jan. 15, 2004

(65) Prior Publication Data
US 2006/0127991 A1 Jun. 15, 2006

(30) Foreign Application Priority Data
Jul. 2, 2002 (DK) .......................... PA 2002 01033

(51) Int. Cl.
*C08B 37/06* (2006.01)
*A23L 1/05* (2006.01)
(52) U.S. Cl. .............................. 536/2; 426/577; 426/580
(58) Field of Classification Search .................. 426/577, 426/580; 536/2; 435/275
See application file for complete search history.

(56) References Cited

U.S. PATENT DOCUMENTS

| | | | |
|---|---|---|---|
| 2,444,266 A | 6/1948 | Owens et al. | |
| 3,622,559 A | 11/1971 | Wiles et al. | |
| 3,636,097 A | 1/1972 | Harvey | |
| 4,065,614 A | 12/1977 | Nelson | |
| 6,428,837 B1 | 8/2002 | Luzio et al. | |
| 7,576,070 B2 | 8/2009 | Kunz et al. | |
| 2009/0186833 A1 | 7/2009 | Kunz et al. | |

FOREIGN PATENT DOCUMENTS
DE 2133572 4/1973
(Continued)

OTHER PUBLICATIONS

Ishii, S. et al., Low-methoxyl pectinprepared by pectinesterase from *Aspergillus japonicus*, J. Food Science, 1979, 44:611-614.
(Continued)

*Primary Examiner* — Kelly Bekker
(74) *Attorney, Agent, or Firm* — Sutherland Asbill & Brennan LLP

(57) ABSTRACT

The present invention relates to a process by which a pectin extract is first de-esterified using a biocatalyst. Secondly, the resulting high molecular weight de-esterified pectin is further de-esterified and optionally amidated using conventional methods. Since the bio-catalyst may de-esterify to a DE of about 25%, conventional acid or alkali de-esterification and optionally amidation will have little impact on the molecular weight of the pectin in question because the number of ester groups have been substantially reduced in the first part of the process. In addition, the novel process leads to novel pectin compositions having higher molecular weight and higher intrinsic viscosity compared to known pectin compositions. These changes lead to low ester pectins providing gels of higher gel strength.

23 Claims, 4 Drawing Sheets

FOREIGN PATENT DOCUMENTS

| | | | |
|---|---|---|---|
| DE | 4133920 | | 11/1993 |
| DE | 10057976 | | 5/2002 |
| WO | WO9858968 | * | 12/1998 |
| WO | WO9937685 | * | 7/1999 |
| WO | 0196404 | | 12/2001 |
| WO | 0242484 A3 | | 5/2002 |
| WO | 2004005352 A1 | | 1/2004 |

OTHER PUBLICATIONS

Thiabault, J-F Rinaudo, M., Interactions of mono- and divalent counterions with alkali- and enzyme-deesterified pectins in salt free solution, Biopolymers, 1985, 24:2131-2143; John Wiley & Sons, Inc.

Voragen, A.G.J. et al., Food Science and Technology Series, Stephen A.M. Ed., Food Polysaccharides and Their Application; Marcel Dekker; New York, 1995, 287-339.

Ralet, M-C. et al., Enzymatically and chemically de-esterified lime pectins: characterisation, polyelectrolyte behaviour and calcium binding properties, Carbohydrate Research, 2001, 336:117-125; Elsevier Science Ltd.

Kim, W.J. et al., Demethylation of Pectin Using Acid and Ammonia, 1978, J. Food Science 43:74-78.

Limberg, G. et al., analysis of different de-esterification mechanisms for pectin by enzymatic finderprinting using endopectin lyase and the endopolygalacturonase II from *A. niger*, Carbohydrate Research, 2000, 327:293-307; Elsevier Science Ltd.

Communication Pursuant to Article 94(3) EPC from the European Patent Office for Application No. 03 735 333.1-2115 (Dec. 13, 2010), pp. 1-8.

International Preliminary Examination Report and International Search Report PCT WO 2004/005352, Nov. 5, 2003, pp. 1-9.

* cited by examiner

PROCESS FOR MAKING DE-ESTERIFIED PECTINS THEIR COMPOSITION AND USES THEREOF

TECHNICAL FIELD

The present invention relates to a process for making low ester pectin which provides high strength gels. The present invention relates in particular to a process for making amidated low ester pectin, which provides high strength gels. Further, the invention relates to the pectins obtainable from this process, and uses of said pectins.

BACKGROUND ART

Pectin is a complex polysaccharide associated with plant cell walls. It consists of an alpha 1-4 linked polygalacturonic acid backbone intervened by rhamnose residues and modified with neutral sugar side chains and non-sugar components such as acetyl, methyl, and ferulic acid groups.

The neutral sugar side chains, which include arabinan and arabinogalactans, are attached to the rhamnose residues in the backbone. The rhamnose residues tend to cluster together on the backbone. So, with the side chains attached this region is referred to as the hairy region and the rest of the backbone is hence named the smooth region.

Pectins are traditionally used as food additives. However, their use has extended into pharmaceutical areas as well. Pectins have long been used as an anti-diarrhea agent and can improve intestinal functions. The anti-diarrhea effect is thought to be in part due to pectin's anti-microbial activity.

Pectins are also effective against gastrointestinal ulcers and enterocolitis. Pectins also influence cell proliferation in the intestines. They also have blood cholesterol lowering effect and exhibit inhibition of atherosclerosis. This effect is the result of interactions between pectins and bile salts. Pectins have also been shown to affect the fibrin network in hypercholesterolaemic individuals.

The ability to interact with many divalent metal ions renders pectins a strong detoxifying agent.

The resistance of pectin to degradation in the upper GI tract and its complete dissolution in the colon makes pectin very suited for colon-specific delivery. Coacervation with gelatin permits the formation of microglobules suitable for controlled-release products. Further, pectin is used in tablet formulations.

According to Kertesz, Z. I: The Pectic Substances, Interscience Publishers, Inc, New York, 1951, pectic materials occur in all plant tissues. However, of industrial importance are particularly apples, beets, flax, grapefruit, lemons, limes, oranges, potatoes, and sunflower. Lately, also the pectin in Aloe vera has shown industrial utility.

Historically, pectin has mainly been used as a gelling agent for jam or similar, fruit-containing, or fruit-flavored, sugar-rich systems. Examples are traditional jams, jams with reduced sugar content, clear jellies, fruit-flavored confectionery gels, non-fruit-flavored confectionery gels, heat-reversible glazings for the bakery industry, heat-resistant jams for the bakery industry, ripples for use in ice cream, and fruit preparations for yoghurt.

A substantial portion of pectin is today used for stabilization of low-pH milk drinks, including fermented drinks and mixtures of fruit juice and milk.

Lately, pectins have been found to be effective for the treatment of heartburn caused by esophagus acid reflux.

The galacturonic acid residues in pectin are partly esterified and present as the methyl ester. The degree of esterification is defined as the percentage of carboxyl groups esterified. Pectin with a degree of esterification ("DE") above 50% is named high methyl ester ("HM") pectin or high ester pectin and one with a DE lower than 50% is referred to as low methyl ester ("LM") pectin or low ester pectin. Most pectin found in fruits and vegetables are HM pectins. Acetate ester groups may further occur at carbon-2 or -3 of the galacturonic acid residues. The degree of acetate esterification ("DAc") is defined as the percentage of galacturonic acid residues containing an acetate ester group. Most native pectins have a low DAc, one exception being sugar beet pectin.

Pectins are soluble in water and insoluble in most organic solvents. Pectins with a very low level of methyl-esterification and pectic acids are for practical purposes only soluble in the form of a potassium or sodium salt.

Pectins are most stable at pH 3-4. Below pH 3, methoxyl and acetyl groups and neutral sugar side chains are removed. At elevated temperatures, these reactions are accelerated and cleavage of glycosidic bonds in the galacturonan backbone occurs. Under neutral and alkaline conditions, methyl ester groups are saponified and the polygalacturonan backbone breaks through beta-elimination-cleavage of glycosidic bonds at the non-reducing ends of methoxylated galacturonic acid residues. These reactions also proceed faster with increasing temperature. Pectic acids and LM pectins are resistant to neutral and alkaline conditions since there are no or only limited numbers of methyl ester groups.

There are many biocatalysts that can specifically modify and degrade pectin molecules. These biocatalysts include endo- and exo-polygalacturonase, pectate lyase, pectin methylesterase, pectin acetylesterase, and rhamnogalacturonase. According to Rastall, R.: LFRA Ingredients Handbook, Leatherhead Food RA, March 1999, Pectinases from *Aspergillus* spp include:

| Biocatalyst | EC no. | Substrate | Action | pH opt. | Temp. opt. |
|---|---|---|---|---|---|
| Pectin lyase | 4.2.2.10 | High ester pectin | Endo a-1,4 b elimination | 5-5.5 | 50 |
| Pectin methyl esterase | 3.1.1.11 | High ester pectin | Random de-esterification | 4-4.5 | 55 |
| Endo-polygalacturonase | 3.2.1.15 | Low ester pectin | Endo a-1,4 depolymerization | 4-4.5 | 45-50 |
| Exo-polygalacturonase | 3.2.1.67 | Low ester pectin | Exo a-1,4 hydrolysis | 5 | 55 |
| Arabinogalactanase | 3.2.1.90 | Pectin hairy regions | Endo b-1,3 1,6 hydrolysis | 4 | 50 |

| Biocatalyst | EC no. | Substrate | Action | pH opt. | Temp. opt. |
|---|---|---|---|---|---|
| Mannanase | 3.2.1.78 | Pectin hairy regions | Endo b-1,4 hydrolysis | 3-6 | 80 |

Suppliers include Gist-Brocades, Novo Nordisk A/S, Röhm, Shin Nihon, and Solvay.

Both HM and LM pectins can form gels, but by totally different, mechanisms. HM pectin form gels in the presence of high concentrations of co-solutes, such as sugar at low pH. LM pectins form thermoreversible gels in the presence of calcium. In addition, the sugar beet pectin can form gels through cross-linking of the ferulated groups as taught by Rombouts (U.S. Pat. No. 4,672,034).

Pectins have a favorable regulatory status as a food additive. They are classified as Generally Recognized As Safe ("GRAS") in the United States and Acceptable Daily Intake ("ADI") in Europe.

In U.S. Pat. No. 2,480,710, Bryant discloses a process for making amidated pectin. A slow setting pectin type with 7.5% to 10% methoxyl content is suspended in 65% IPA with 10% ammonium hydroxide (28% ammonia), and the mix is stirred for two hours at 25° C. After draining of ammoniacal alcohol, fresh 65% IPA is added. Concentrated HCl is then added to an acidity, which results in a pH of a 1% dispersion of the amidated pectin of 3-4. pH higher than 5 and below 3 is likely to cause further undesirable modification during drying. The suspension is filtered and rinsed with first 65% IPA and then 90% IPA and then dried. The conversion follows

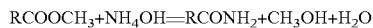

$$RCOOCH_3 + NH_4OH = RCONH_2 + CH_3OH + H_2O$$

The desired amount of ammonia ranges from 2 to 16 times the amount theoretically required to de-esterify completely the original starting material.

Instead of using an isolated pectin, wet pectin precipitate can be used.

In U.S. Pat. No. 2,478,170, William et al. disclose that low ester pectin can be prepared by the partial de-esterification of either pectin or protopectin. William et al use a pectin starting material, which is unmodified and which displays a degree of esterification of about 80%. Acid, alkali or biocatalyst catalyzes this de-esterification. In the disclosure, alkali is used as the de-esterifying agent to reach a degree of esterification from 20% to 30%.

In U.S. Pat. No. 2,448,818, McCready et al. disclose the use of citrus pectinesterase to transform in situ pectin into low ester pectin having a methoxyl content of 6%, corresponding to a degree of esterification of about 37%. The biocatalyst utilized is naturally occurring in citrus fruit, and such plant esterases are known to result in a block wise de-esterification.

In U.S. Pat. No. 3,622,559, Wiles et al. makes a pectin starting material through acid extraction at around 70° C. for 1-2 hours. This leads to a pectin having a molecular weight (Mw) of 180,000 to 200,000 Daltons and a methoxyl content of 10% (DE=61%) to 10.5% (DE=64%). This pectin may then be further de-esterified by treating the pectin with acid or an ammonia-alcohol mixture. This process leads to low ester pectin having molecular weight (Mw) of 120,000 to 200,000 Daltons.

In U.S. Pat. No. 4,065,614, Nelson discloses an amidated pectin having a degree of amidation of at least 27%. The starting pectin material must have a degree of esterification over 60%, and amidation is conducted using a mixture of liquid ammonia in a suitable organic solvent such as isopropanol. The reaction is carried out at a temperature within the range −15-+15° C. until the degree of amidation has reached at least 27%. The pectin starting material is disclosed as any of the commercially available high ester pectins.

In DK 157,616 B, Buhl et al. disclose an amidated pectin having a degree of amidation of 5-25%, a degree of esterification of at least 50% and an average molecular weight of 15,000-75,000 Daltons. The pectin starting material is made according to a conventional acid extraction, and amidation is performed in a mixture of liquid ammonia and isopropanol at 0° C.

In WO 98/58968, Larsen et al. disclose a process for making selected fractions of high ester pectin. The process involves two or more extraction steps characterized in that each proceeding step involves extraction of the pectin from the preceding step at lower pH. The high ester pectin fractions are also useful as starting materials for making de-esterified pectin. The pectin starting material for de-esterification has a DE above 50%, and is treated with a de-esterifying agent to obtain a pectin fraction having a degree of esterification, which is reduced by at least 5% relative to that of the high ester pectin fraction and a degree of amidation in the range 0-25%. De-esterifying agents are acids, alkalis or combinations thereof.

In WO 00/08952, Madsen et al. disclose a pectin composition providing no substantial gelation. It is disclosed that the degree of esterification and/or degree of block structure may be modified using biocatalysts obtained from plants or bacteria.

In WO 00/15830, Christensen et al. disclose a process for treating pectin with a pectin methyl esterase. The pectin methyl esterase is not derived from plant, but has at least one plant pectin methyl esterase property. That property is the block-wise de-esterification of pectin, and the treated pectin is disclosed to contain at least 70% ester groups.

In U.S. Pat. No. 6,069,000, Andersen et al. disclose a biocatalyst with pectin esterase activity. The inventors believe that the improved performance of the pectin esterase of the invention is due to the mode of action of the biocatalyst of the invention preferably providing a block-wise distribution of the acid groups in the pectin.

In U.S. Pat. No. 5,707,847, Christgau et al. have disclosed a biocatalyst exhibiting pectin methyl esterase activity. The biocatalyst can be used for demethylation of pectin, e.g. from citrus, apple, sunflower and/or sugar beet. The biocatalyst can be used to produce low methylated pectin from high methylated pectin.

In this reference, microbial pectin esterase is comparable in its effect to acid and alkali, i.e. de-esterification is random in nature.

In the conventional processes of de-esterifying pectin, chemical processes involve the use of acid or alkali treatment of high ester pectin. These processes are known to result in depolymerization of the high ester pectin during de-esterification, and consequently, chemical de-esterification typically must take place at low temperatures. This on the other hand makes the de-esterification process slow and in addition, investments in cooling equipment make such de-esterified pectins more costly to produce. Further, since the chemical processes are known to remove ester groups in a random fashion, the resulting de-esterified pectins are less blocky with respect to carboxylic acid groups.

Enzymatic processes are known to de-esterify high ester pectin in either a random fashion or in a block wise fashion. Further, enzymatic de-esterification is known to reduce or to eliminate depolymerization of the high ester pectin during de-esterification.

However, enzymatic de-esterification suffers from the fact that the degree of esterification cannot be brought below about 25% as taught by Smythe (U.S. Pat. No. 2,599,531). Additionally, no enzymatic process has been disclosed, which will result in amidated pectins.

Thus, there remains a problem that conventionally-made amidated low ester pectins still suffer from glycosidic breakdown and aggregation during amidation. This leads to amidated pectins with a changed conformation due to aggregation.

The existence of pectin aggregates in solution has been reported in the literature (Sorochan et al. 1971. Carbohydr. Res. vol. 20, pp. 243-248; Jordan, R. C. and Brant, D. A. 1978. Biopolymers. vol. 17, pp. 2885-2895; Davis et al. 1980. Int. J. Biol. Macromol. vol. 2, pp. 330-332). Pectin aggregates form in solution under non-gelling conditions and could be considered precursors to gelation U.S. Pat. No. 6,143,337 to Fishman, et al. This aggregation is speculated to cause the amidated pectin to become less soluble, which leads to a lower gelling power than theoretically possible. Additionally, non-amidated low ester pectins having a degree of esterification below 25% have heretofore been made by either acid or alkaline de-esterification, and for these low ester pectins the same problem exists, namely that acid or alkali hydrolysis reduce the molecular weight of the pectin and consequently produce a low ester pectin with a lower gelling power than theoretically possible.

Consequently, there is a need for a process, which offers
A method for reducing the degree of esterification to below 25% with less breakdown of the glycosidic links in the pectin backbone.
Non-amidated low ester pectins with a degree of esterification below 25% having higher molecular weight and a non-aggregated or less aggregated conformation to provide for an increase in gelling power.
A method for making amidated pectin with higher molecular weight and a less aggregated conformation.
Amidated low ester pectins of higher molecular weight and a non-aggregated or less aggregated conformation to provide for an increase in gelling power.

BRIEF DESCRIPTION OF THE INVENTION

The present invention relates to a process by which a pectin extract is first de-esterified using a biocatalyst. Secondly, the resulting high molecular weight de-esterified pectin is further de-esterified and optionally amidated using conventional methods. Since the bio-catalyst may de-esterify to a DE of about 25%, conventional de-esterification and optionally amidation will have little impact on the molecular weight of the pectin because the number of ester groups have been substantially reduced in the first part of the process.

The present invention relates to a process for making low ester pectin comprising the steps of: obtaining a starting pectin material, contacting the starting pectin material with a bio-catalyst capable of de-esterifying the starting pectin material, permitting the bio-catalyst to de-esterify the starting pectin material to produce a de-esterified pectin, and further de-esterifying said de-esterified pectin by contacting the de-esterified pectin with an acid or an alkali capable of de-esterifying and permitting the acid or alkali to further de-esterify said de-esterified pectin to produce a low ester pectin, wherein the de-esterified pectin under or after said further de-esterification optionally is amidated by contacting said de-esterified pectin with ammonia.

The present invention also relates to an amidated pectin, characterized by having a ratio, $R_2$, of intrinsic viscosity of the starting de-esterified pectin to the intrinsic viscosity of the amidated pectin ranging from 1.03 to 1.18.

The amidated pectins of the present invention are useful in foodstuffs, more particularly jams and jellies and dairy products. The amidated pectins of the present invention are also useful in pharmaceutical products, personal care products and household products.

Other exemplary embodiments and advantages of the present invention may be ascertained by reviewing the present disclosure and the accompanying drawings.

BEST MODES FOR CARRYING OUT THE INVENTION

Figure 1:
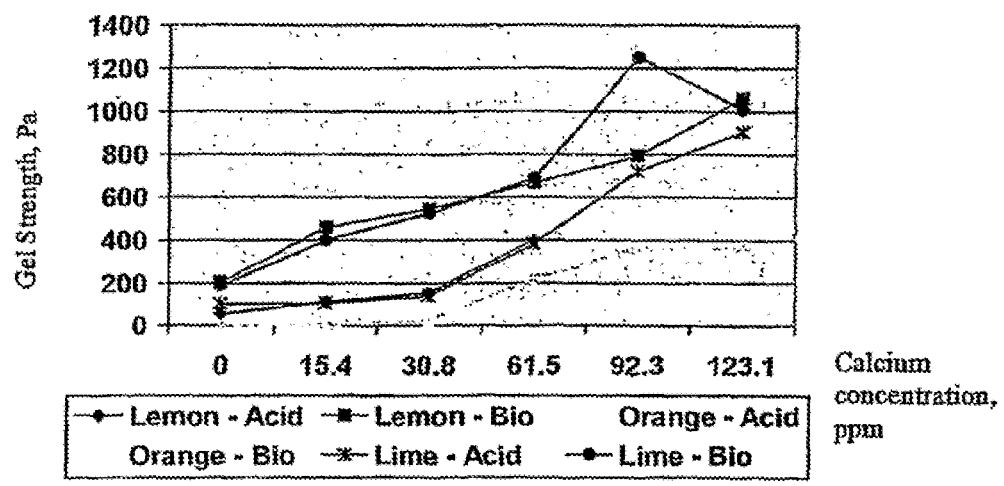
FIG. 1 presents the data in table 2.3 with gel strength on the y-axis and calcium concentration along the x-axis.
Figure 2:
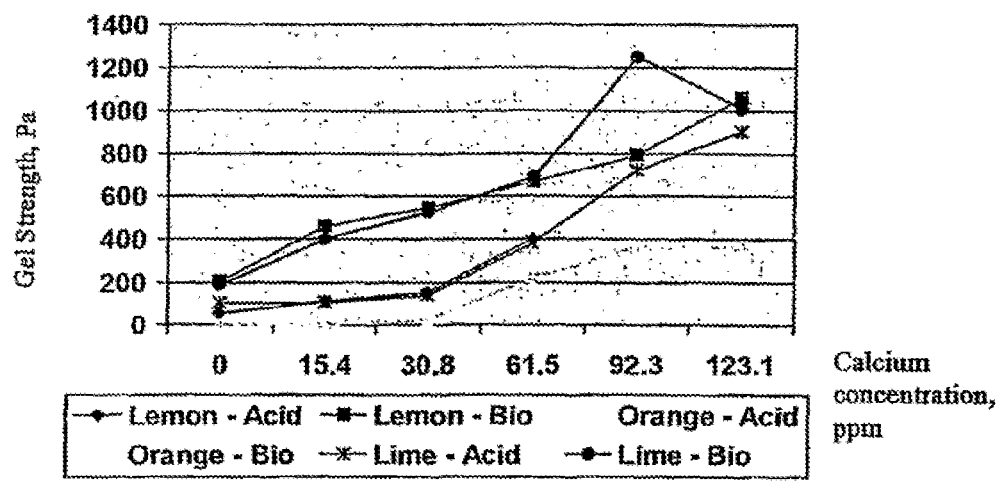
FIG. 2 pictures the data from table 2.4, in which the y-axis represents values of critical stress, and the x-axis represents calcium concentration.
Figure 3:
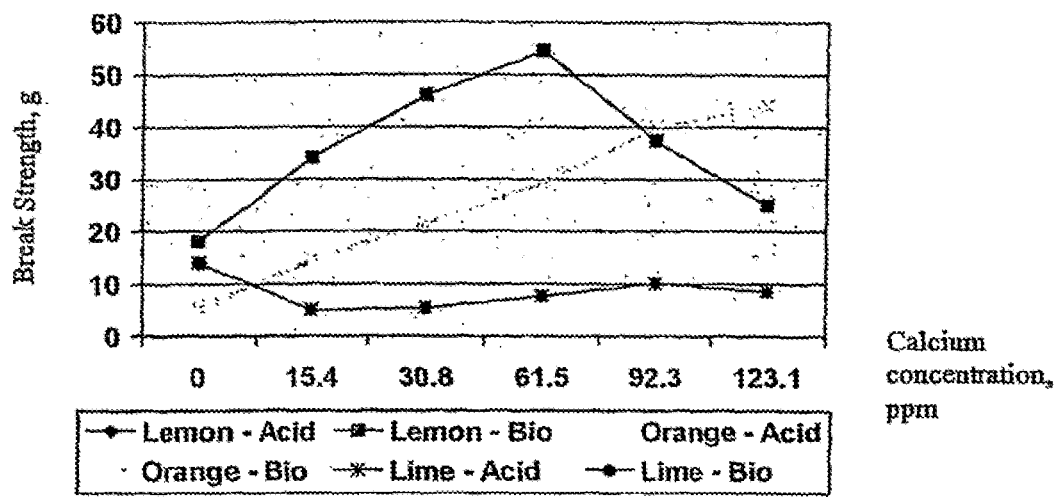
FIG. 3 is a plot with calcium concentration along the x-axis and break strength along the y-axis.
Figure 4:
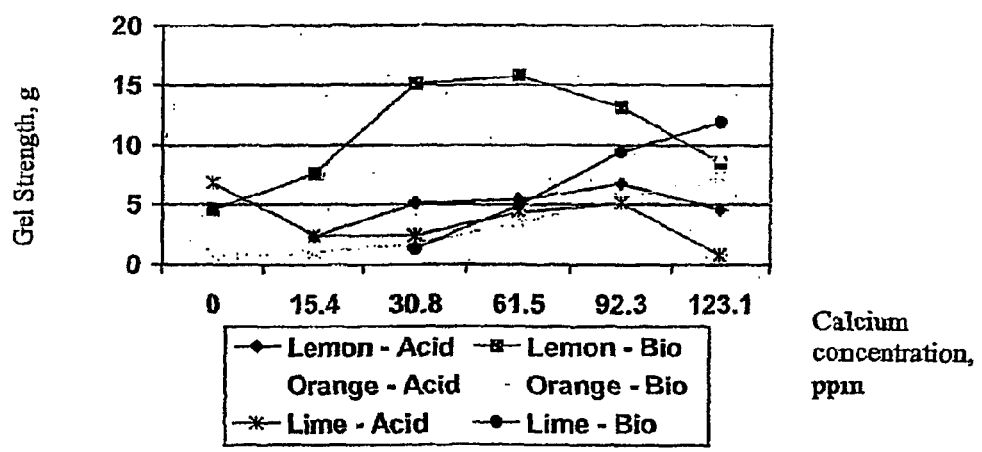
FIG. 4 pictures the data from table 2.6, with calcium concentration along the x-axis and gel strength along the y-axis.
Figure 5:
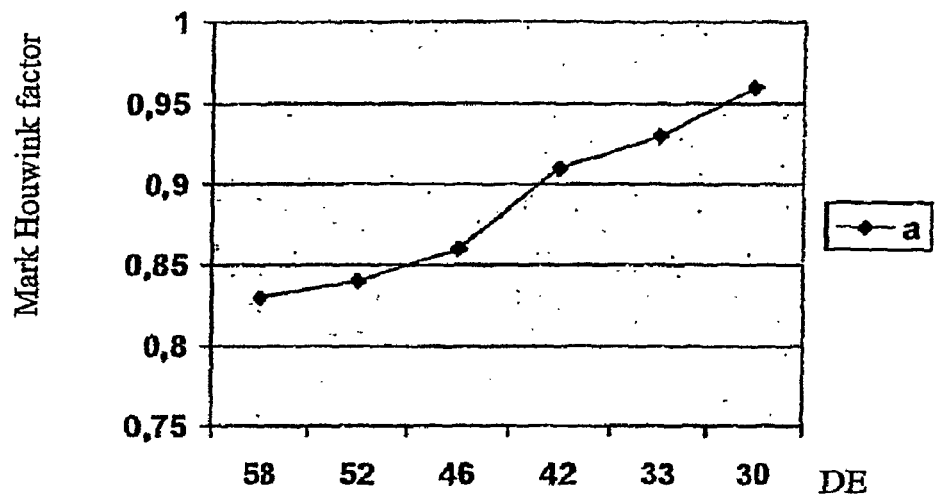
FIG. 5 is a plot of the data in table 3.1, with DE on the x-axis and the Mark-Houwink factor along the y-axis.
Figure 6:
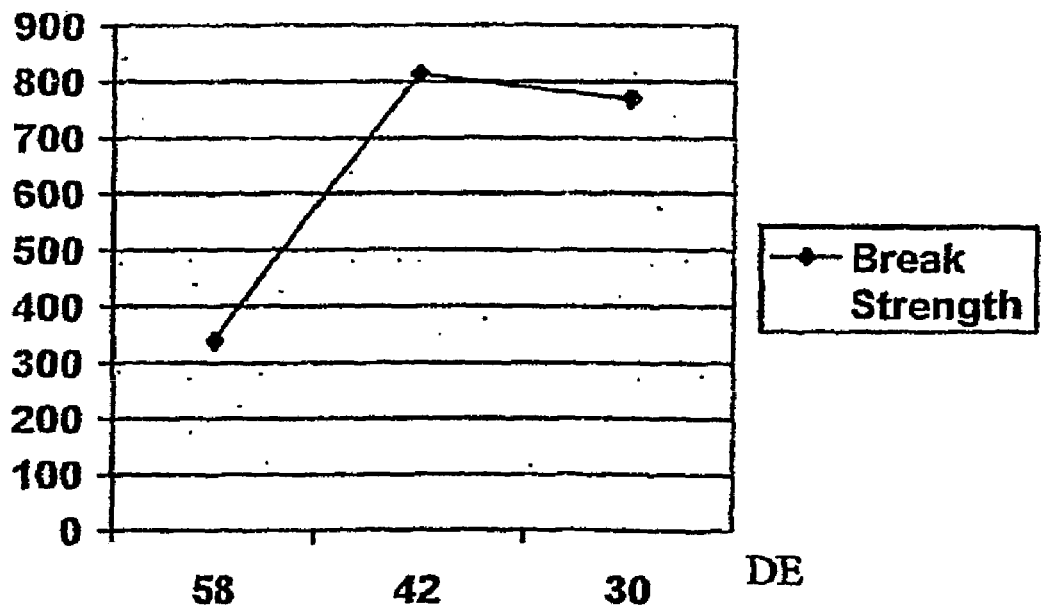
FIG. 6 is a plot of the data from table 3.2 with DE along the x-axis and break strength along the y-axis.

While not wishing to be bound by theory, during an amidation process, the pectin material will change molecular weight and conformation. Pectin molecules will be influenced by two phenomena. One is beta-elimination, by which the molecule is depolymerized to a lower molecular weight and the other is aggregation, by which the molecules change conformation and molecular weight is increased. It has now been found that the higher % DE prior to amidation, the more aggregated the final product becomes. This aggregation, together with a more pronounced beta-elimination for high % DE pectin, is presumed to be responsible for the decrease in gel strength that is observed as % DE of the pectin prior to amidation is increased. Aggregation in extreme will lead to insolubility of the polymer and could also be expected to be responsible for formation of micro-gels or pre-gelation, resulting in improper gel structures. Therefore, the pectin used for amidation must be de-esterified to minimize the tendency of aggregation. To achieve a subsequent amidated pectin with high gelling power, the de-esterification step must also be conducted under conditions that minimize depolymerization.

It has now been discovered that by first using biocatalytic (e.g., enzymatic) de-esterification, the depolymerization and aggregation during a subsequent chemical de-esterification and optionally amidation are greatly reduced. The result is de-esterified and optionally amidated pectins with hitherto unknown low tendency towards aggregation and simultaneously unknown high molecular weight.

In a preferred embodiment, the de-esterification with biocatalyst is performed to a degree of esterification of between 60% and 30% before amidation.

In a more preferred embodiment, the de-esterification with biocatalyst is carried out to a degree of esterification of between 45% and 30%.

In an even more preferred embodiment, the de-esterification with biocatalyst is carried out to a degree of esterification of between 45% and 40%.

In a most preferred embodiment, the de-esterification with biocatalyst is carried out to a degree of esterification of 42%.

These differences to known pectins result in a number of advantages: De-esterified pectins made according to the present invention produce aqueous gels of higher rigidity and break strength than known de-esgerified pectins, and the present invention makes it easy to accurately control the degree of esterification and the distribution of ester groups and/or amide groups.

The process involves the following steps:

First, high ester pectin is extracted from a pectin containing starting material according to known methods, i.e. extraction in either acid or alkaline water at elevated temperature. Optionally, the extract may be concentrated according to known technique. Alternatively, commercial dry high ester pectin or previously extracted, purified, isolated and dried high ester pectin is re-dissolved, and optionally concentrated.

Secondly, if necessary, the pectin solution is adjusted in order to provide the desired conditions for the activity of the biocatalyst. These adjustments may entail changing or monitoring the pectin solution's temperature, pH or ionic concentration.

If the pH of the pectin solution is to be adjusted to the optimum pH of the biocatalyst used, and in cases where the activity of the biocatalyst is to be increased at lower pH values, the ionic strength of the precipitate or suspension may be increased with salts, such as sodium chloride.

While stirring, the biocatalyst is allowed to act on the pectin, and the degree of esterification is easily monitored through the necessary addition of alkali to maintain the reaction pH. In this way, it is easy to obtain a de-esterified pectin with a particular degree of esterification. The process may also be carried out continuously. In this case, in-line titration equipment can be used to monitor the degree of esterification, and the tube length, in which the de-esterification takes place and the flow rate of the material to be de-esterified, will determine the final degree of esterification. Other methods for determining the degree of esterification, such as the use of Near Infra Red spectrometry (NIR), may be used to monitor the degree of esterification.

Thirdly, at any desired degree of esterification, the enzymatic de-esterification may be terminated with heat, acid or alkali.

However, it has been discovered that particularly high intrinsic viscosity and high Mark-Houwink factor which, while not wishing to be bound by theory, is attributed to low aggregation, is obtained when the de-esterification of the starting material is terminated when the degree of esterification has been reduced to within the range of 30-60%. This leads to particularly high gel power of the resulting amidated pectins. Further, it has been discovered, that when the de-esterification is brought within the same range, i.e. 30-60% using conventional means, the aggregation of the resulting amidated pectin will be similar to the aggregation of amidated pectin made by first de-esterifying with biocatalyst. However, using the conventional approach, the molecular weight will be lower than is the case when using biocatalyst. Furthermore amidated pectins having lower gel power than amidated pectins made by first de-esterifying using a biocatalyst will be obtained.

Fourthly, the de-esterified pectin is precipitated in alcohol if the de-esterification took place in solution. After pressing, the pH of the mix of precipitated de-esterified pectin and alcohol is then either decreased with acid or increased with alkali according to conventional art. By doing so, degrees of esterification below 25% can be achieved without a significant loss of molecular weight of the de-esterified pectin. If the alkali used is ammonia, de-esterified and amidated pectins result without a significant loss in molecular weight of the de-esterified and amidated pectin The amidation takes place by suspending the precipitated de-esterified pectin in 60-70%, preferably 70% isopropanol in which is dissolved 20-30% (V/V) preferably 25-26% (V/V) ammonia. This suspension is kept at 0° C. to room temperature, preferably 0-10° C. and most preferably about 5° C. for a time sufficient to cause the desired degree of amidation. After completion of the amidation, the amidated pectin is drained and washed with 50-70%, preferably 60% isopropanol and the pH is adjusted to 4.2-4.4 with an alkali such as NaOH or $Na_2CO_3$. Finally, the amidated pectin is washed with 40-60% isopropanol preferably 50% isopropanol, pressed and dried at a temperature below 75° C.

Finally, the resulting end product is dried and ground according to conventional methods.

This process leads to de-esterified and optionally amidated pectins of hitherto unknown functionality, particularly with respect to the gel properties in aqueous media, including gel strength, break strength, viscosity and to gels displaying a lower degree of syneresis and high gelling temperatures and high melting temperatures. In addition, the amidated pectins of the present invention are advantageous because of their increased solubility in aqueous systems.

Without wishing to be bound by theory, it is believed that these attributes result from a substantially lower depolymerization of the pectin according to the present invention together with a lower tendency towards aggregation.

These improved properties of the amidated pectin according to the present invention, are useful in the manufacturing of foodstuffs, pharmaceutical products, personal care products and household products.

The amidated pectins of the present invention are particularly useful in foodstuffs such as jams and jellies at both high and low soluble solids content with or without fruit. Examples of such end uses are traditional jams, jams with reduced sugar content, clear jellies, fruit-flavored confectionery gels, non-fruit-flavored confectionery gels, heat-reversible glazings for the bakery industry, heat-resistant jams for the bakery industry, ripples for use in ice cream, and fruit preparations for yoghurt.

The amidated pectins of the present invention are also particularly useful in dairy products such as yoghurts, custards, flans, puddings, toppings and fillings.

Examples of pharmaceutical products which the amidated pectins of the present invention may be used include tablets, capsules, wound-care and ostomy products which utilize pectins in their formulations.

Examples of personal care products which the amidated pectins of the present invention may be used include various cremes, lotions and toothpastes which utilize pectins in their formulations.

Examples of household products which the amidated pectins of the present invention may be used include various air freshener gels, cleaning products and detergent formulations which utilize pectins in their formulations.

Determination of Rheological Terms:

Critical stress as determined on RheoStress RS-100 is a measure of the break strength of the gel. The values obtained with this type of equipment are characterized by being independent of the particular apparatus used.

Break strength as measured by TA.XT2 Analyser is a destructive method of measuring the force needed to rupture a gel, and this method produces values, which are not necessarily independent of the apparatus used.

Gel strength as measured on RheoStress RS-100 is a non-destructive way of measuring the hardness of a gel.

Gel strength as measured on TA.XT2 Analyser is similarly a measure of the hardness of the gel.

Intrinsic viscosity is the viscosity of an infinitely diluted solution of the polymer. A low intrinsic viscosity indicates a polymer, which is heavily coiled or branched or aggregated and resembles a spherical conformation. A high intrinsic viscosity indicates a polymer, which is more rod-like and thus, less coiled, less branched and less aggregated. These indications are only true if the polymers in question are of equal molecular weight.

When the conformation of polymers of different molecular weight is to be compared, the Mark-Houwink factor, "a", is used. A low value of "a" signifies a polymer, which is more spherical or aggregated in conformation, whereas a high value of "a" signifies a polymer, which is less aggregated and thus, more rod-like. The Mark-Houwink factor is given by the expression "Intrinsic viscosity"=$KM^a$, in which "intrinsic viscosity" represents the intrinsic viscosity of the polymer determined by solution viscosity measuring method, K is a constant and M is the molecular weight of the polymer and "a" represents the Mark-Houwink factor.

Determination of Degree of Esterification (DE) and Galacturonic Acid (GA) in Non-Amide Pectin.

Principle:

This method is a modification of the FAO/WHO method for determination of % DE and % GA in pectin which does not contain amide and acetate ester (Compendium of food additive specifications, Addendum 9, Joint FAO/WHO Expert Committee on Food Additives, 57$^{th}$ session, Rome, Italy, 5-14 Jun. 2001).

Procedure—Determination of % DE and % GA:

(Acid alcohol: 100 ml 60% IPA+5 ml HCl fuming 37%)

1. Weigh 2.000 g pectin in a 250 ml glass beaker.
2. Add 100 ml acid alcohol and stir on a magnetic stirrer for 10 min.
3. Filtrate through a dried, weighed glass filter crucible.
4. Rinse the beaker completely with 6×15 ml acid alcohol.
5. Wash with 60% IPA until the filtrate is chloride-free* (approximately 500 ml).

*(Chloride test: Transfer approximately 10 ml filtrate to a test tube, add approximately 3 ml 3 N $HNO_3$, and add a few drops of $AgNO_3$. The filtrate will be chloride-free if the solution is clear, otherwise there will be a precipitation of silver chloride.)

6. Wash with 20 ml 100% IPA.
7. Dry the sample for 2½ hours at 105° C.
8. Weigh the crucible after drying and cooling in desiccator.
9. Weigh accurately 0.4000 g of the sample in a 250 ml glass beaker.
10. Weigh two samples for double determination.
11. Wet the pectin with approximately 2 ml 100% IPA and add approximately 100 ml carbon dioxide-free, deionized water while stirring on a magnetic stirrer.

The sample is now ready for titration, either by means of an indicator or by using a pH-meter/autoburette.

Procedure—Determination of % DE Only:

(Acid alcohol: 100 ml 60% IPA+5 ml HCl fuming 37%)

1. Weigh 2.00 g pectin in a 250 ml glass beaker.
2. Add 100 ml acid alcohol and stir on a magnetic stirrer for 10 min.
3. Filtrate through a Büchner funnel with filter paper.
4. Rinse the beaker with 90 ml acid alcohol.
5. Wash with 1000 ml 60% IPA.
6. Wash with approximately 30 ml 100% IPA.
7. Dry the sample for approximately 15 mininutes on Büchner funnel with vacuum suction.
8. Weigh approximately 0.40 g of the sample in a 250 ml glass beaker.
9. Weigh two samples for double determination.
10. Wet the pectin with approximately 2 ml 100% IPA and add approximately 100 ml deionized water while stirring on a magnetic stirrer.

The sample is now ready for titration, either by means of an indicator or by using a pH-meter/autoburette.

Titration Using Indicator:

1. Add 5 drops of phenolphtalein indicator and titrate with 0.1 N NaOH until change of color (record it as $V_1$ titer).
2. Add 20.00 ml 0.5 N NaOH while stirring. Let stand for exactly 15 minutes. When standing the sample must be covered with foil.
3. Add 20.00 ml 0.5 N HCl while stirring and stir until the color disappears.
4. Add 3 drops of phenolphtalein and titrate with 0.1 N NaOH until change of color (record it as $V_2$ titer).

Blind Test:

1. Add 5 drops phenolphtalein to 100 ml carbon dioxide-free or dionized water (same type as used for the sample), and titrate in a 250 ml glass beaker with 0.1 N NaOH until change of color (1-2 drops).
2. Add 20.00 ml 0.5 N NaOH and let the sample stand untouched for exactly 15 minutes. When standing the sample must be covered with foil.
3. Add 20.00 ml 0.5 N HCl and 3 drops phenolphtalein, and titrate until change of color with 0.1 N NaOH (record it as $B_1$).

Titration Using pH-Meter/Autoburette:

Using Autoburette type ABU 80 the following settings may be applied:

|  | Sample with % DE <10 | Blind test |
| --- | --- | --- |
| Proportional band | 0.5 | 5 |
| Delay sec. | 50 | 5 |
| Speed - $V_1$ | 10 | 5 |
| Speed - $V_2$ | 15 | 5 |

1. Titrate with 0.1 N NaOH to pH 8.5 (record the result as $V_1$ titer).

2. Add 20.00 ml 0.5 N NaOH while stirring, and let the sample stand without stirring for exactly 15 minutes. When standing the sample must be covered with foil.
3. Add 20.00 ml 0.5 N HCl while sting and stir until pH is constant.
4. Subsequently, titrate with 0.1 N NaOH to pH 8.5 (record the result as $V_2$ titer).

Blind Test:
1. Titrate 100 ml carbon dioxide-free or deionized (same type as used for the sample) water to pH 8.5 with 0.1 N NaOH (1-2 drops).
2. Add 20.00 ml 0.5 N NaOH while stirring and let the blind test sample stand without stirring for exactly 15 minutes. When standing the sample must be covered with foil.
3. Add 20.00 ml 0.5 N HCl while stirring, and stir until pH is constant.
4. Titrate to pH 8.5 with 0.1 N NaOH (record it as $B_1$).

Calculation:

$$V_t = V_1 + (V_2 - B_1)$$

% DE (Degree of esterification=$((V_2-B_1) \times 100)/V_t$
% DFA (Degree of Free Acid)=100-% DE
% GA* (Degree of Galacturonic acid)=$(194.1 \times V_t \times N \times 100)/400$

*On Ash- and Moisture-Free Basis 194.1: Molecular weight of Galacturonic acid
N: Corrected normality for 0.1 N NaOH used for titration (e.g. 0.1002 N)
400: Weight in mg. of washed and dried sample for titration
% Pure pectin=(acid washed and dried amount of pectin×100)/(weighed amount of pectin)

Determination of Degree of Amidation (DA) and Degree of Esterification (DE), in Pectin Principle:
This method is a modification of the FAO/WHO method for determination of % DE, % DA in pectin (Compendium of food additive specifications, Addendum 9, Joint FAO/WHO Expert Committee on Food Additives, 57th session, Rome, Italy, 5-14 June 2001, pages 3-4), which does not contain acetate ester.

Procedure:
(Acid alcohol: 100 ml 60% IPA+5 ml HCl fuming 37%)
1. Weigh 2.000 g pectin into a 250 ml glass beaker.
2. Add 100 ml acid alcohol and stir on a magnetic stirrer for 10 minutes
3. Filter through a dried, Büchner funnel and filter paper type strong, viscous, super rapid, or similar.
4. Rinse the beaker completely with 6×15 ml acid alcohol.
5. Wash with 60% IPA until the filtrate is chloride-free* (approximately 500 ml).

*(Chloride test: Transfer approximately 10 ml filtrate to a test tube, add approximately 3 ml 3 N $HNO_3$, and add a few drops of $AgNO_3$. The filtrate will be chloride-free if the solution is clear, otherwise there will be a precipitate of silver chloride.)

6. Wash with 20 ml 100% IPA.
7. Dry for about 15 minutes on Büchner funnel with vacuum suction.
8. Weigh the crucible after drying and cooling in desiccator.
9. Weigh approximately 0.4000 g of the sample into a 250 ml glass beaker.
10. Weigh two samples for double determination.
11. Wet the pectin with approximately 2 ml 100% IPA and add approximately 100 ml carbon dioxide-free water while stirring on a magnetic stirrer. Under these conditions, amidated pectin will not go into this solution. However, the amidated pectin will be soluble in the subsequent alkali conditions.

The sample is now ready for titration, either by means of an indicator or by using a pH-meter/autoburette.

Indicator:
1. Add 5 drops of phenolphtalein indicator and titrate with 0.1 N NaOH until change of color (record it as $V_1$ titer).
2. Add 20.00 ml 0.5 N NaOH while stirring. Let stand for exactly 15 minutes. While standing, the sample must be covered with foil.
3. Add 20.00 ml 0.5 N HCl and stir on a magnetic stirrer until the color disappears.
4. Add 3 drops of phenolphtalein and titrate with 0.1 N NaOH until change of color (record it as $V_2$ titer).

Blind Test:
1. Add 5 drops phenolphtaleintol to 100 ml carbon dioxide-free water, and titrate in a 250 ml glass beaker with 0.1 N NaOH until change of color (1-2 drops).
2. Add 20.00 ml 0.5 N NaOH and let the sample stand untouched for exactly 15 minutes. While standing, the sample must be covered with foil.
3. Add 20.00 ml 0.5 N HCl and 3 drops phenolphtalein, and titrate until change of color with 0.1 N NaOH (record it as $B_1$).

pH-Meter/Autoburette:
1. Titrate with 0.1 N NaOH to pH 8.5 (record the result as $V_1$ titer).
2. Add 20.00 ml 0.5 N NaOH, and let the sample stand untouched for exactly 15 minutes. While standing, the sample must be covered with foil.
3. Add 20.00 ml 0.5 N HCl and stir on a magnetic stirrer until pH is constant.
4. Subsequently, titrate with 0.1 N NaOH to pH 8.5 (record the result as $V_2$ titer).

Blind Test:
1. Titrate 100 ml carbon dioxide-free water to pH 8.5 with 0.1 N NaOH (1-2 drops).
2. Add 20.00 ml 0.5 N NaOH and let the blind test sample stand untouched for exactly 15 minutes. While standing, the sample must be covered with foil.
3. Add 20.00 ml 0.5 N HCl, and stir on a magnetic stirrer until pH is constant.
4. Titrate to pH 8.5 with 0.1 N NaOH (record it as $B_1$).

Distillation is carried out on Kjeltex (distillation apparatus).

Kjeltex:
Follow the given instructions for starting and closing.
1. Transfer quantitatively the sample to the destruction tube by rinsing the beaker with a total of 100 ml carbon dioxide-free water in three steps.
2. Place the receiving flask, containing 150 ml carbon dioxide-free water and 10.00 ml 0.1 N HCl, in the apparatus.
3. Add at least 20 ml 10% NaOH to the destruction tube including the sample.
4. Set the distillation time at 5½ minutes.
5. Titrate the distillate with 0.1 N NaOH to pH 6.2 (record it as $V_3$ titer) or add 8 drops methyl red and titrate with 0.1 N NaOH until change of color (record it as $V_3$ titer).

The blind test sample is distilled and titrated as the sample (record it as $B_2$ titer).

Calculation:

$$V_t = V_1 + (V_2 - B_1) + (B_2 - V_3)$$

DE (Degree of esterification)=$(V_2-B_1) \times 100/V_t$
DA (Degree of amidation)=$(B_2-V_3) \times 100/V_t$ Determination of Molecular Weight (Mw) and Intrinsic Viscosity (IV).

For this, High Performance Size Exclusion Chromatography (HPSEC) with triple detection is used.

Principle:

A pectin sample is fractionated according to hydrodynamic volume, using size exclusion chromatography. After separation, the sample is analysed by a triple detector system, consisting of a refractive index (RI) detector, a Right Angle Laser Light Scattering (RALLS) detector and a differential viscometer. Information from these detectors lead to determination of molecular weight (Mw) and intrinsic viscosity (IV). The Mark-Houwink factor is calculated using the molecular weight and intrinsic viscosity as obtained using this method.

Materials:
- Pump model 515, Waters, Hedehusene, Denmark.
- Degasser, Gynkotek, Polygen Scandinavia, Århus, Denmark.
- Column oven, Waters, Hedehusene, Denmark.
- AS-3500 Autosampler, with sample preparation module, Dionex Denmark, Rødovre, Denmark.
- 3 linear mixed bed columns, TSK-GMPWXL, Supelco, Bellefonte Pa., USA.
- Liquid phase: 0.3 M lithium acetate buffer pH 4.8, Fluka Chemie AG, Buchs, Switzerland.
- Dual detector, RI, Viscometry, Model 250, Viscotek, Houston, Tex., USA.
- RALLS Model 600, Viscotek, Houston, Tex., USA.

Method:

Approximately 2 mg of the sample is weighed into a 2000 ml vial. The sample is then dissolved in the autosampler, by following schedule: 8 ml of ethanol is added, then 1300 ml of acetate buffer (0.3 M, pH 4.8), sample is heated to 75° C. and mixed for 9.9 minutes. 300 ml of the preparation is diluted with 900 ml of acetate buffer, then mixing for 9.9 minutes. Sample is left at ambient temperature for 20 minutes. 100 ml of the sample is injected with a 100 ml full loop and flow rate is 0.8 ml/min. Two detectors are present in line, a right angle laser light Scattering (RALLS) detector (Viscotek) and a dual detector consisting of a refractive index detector and a viscometer (Viscotek).

The specific refractive index increment (dn/dc) value for pectin is set at 0.144. Data from detectors are processed by tri-SEC software (Viscotek).

Rheological measurements of synthetic gels

Materials:
- 3.933 g potassium citrate, $K_3C_6H_5O_7, H_2O$, pro analysis, Merck KGaA, 64271 Darmstadt, Germany.
- 1.0 g sodium benzoate, pro analysis, Merck KGaA, 64271 Darmstadt, Germany.
- 3.12 g pectin sample to be analyzed.
- 124.08 g sugar.
- X ml 0.1 M $CaCl_2$, pro analysis, Merck KGaA, 64271 Darmstadt, Germany.
- 18+Y ml 50% w/v Citric acid, pro analysis, Merck KGaA, 64271 Darmstadt, Germany.
- Oil, liquid at room temperature.
- 260 g ion exchanged water.
- 6 crystallisation dishes, diameter: 61 mm, height: 9 mm.
- Clear pressure sensitive adhesive tape.
- TA.XT2 Texture Analyser, Stable Micro Systems, England.
- RheoStress RS 100, Haake Fisons, Reciprotor Engineering A/S, DK-4930 Maribo, Denmark.
- Measuring system for RheoStress RS 100: cup/spindle Z20 DIN, Haake Fisons, Reciprotor Engineering A/S, DK-4930 Maribo, Denmark.
- Electric hot plate, Buch & Holm A/S, DK-2730 Herlev, Denmark.
- 1 liter pot
- Electric blade stirrer, RW 20, Janke & Kunkel, IKA-Werk, Bie & Berntsen A/S, Rødovre, Denmark.
- Balance, Mettler PJ 6000, Mettler Instruments, Greifensee-Zürich, Switzerland.

Method:

117 g of IPPA buffer (3.933 g potassium citrate/l, 18 ml citric acid/l, 1.0 g sodium benzoate/l) and 260 g of ion-exchanged water is mixed in a 1 liter pot. The pectin sample to be analyzed is dry blended with 24 g sugar. Sugar and pectin blend is then added to the preparation described above and heated to boiling, while stirring at 500 rpm, 100.08 g of sugar is the added and boiling is continued until all sugar has dissolved. Ion-exchanged water is added, until a weight of 520 g. Mix Y ml of $CaCl_2$ and citric acid such that pH of the final preparation is 3.0±0.1 and add this mix to the boiling solution of pectin and sugar while stirring at 1000 rpm. The weight of the solution is adjusted to 520 g by addition of ion exchanged water and poured into 6 crystallisation dishes (equipped with clear pressure sensitive adhesive tape) and a preheated rheometer cup Z20 DIN at 90° C. The cup is covered with oil to prevent evaporation.

The 6 crystallisation dishes are left over night at 25° C., then gel and breaking strength is determined, together with distance to break using TA.XT2 Texture Analyser.

Y-Values:

| $Ca^{2+}$ (4 mg/ml) added (ml) | $Ca^{2+}$ (ppm) |
|---|---|
| 0 | 0 |
| 2 | 15.4 |
| 4 | 30.8 |
| 8 | 61.5 |
| 12 | 92.3 |
| 16 | 123.1 |

TA.XT2 Texture Analyser Analyses:

A plunger of 0.5 inch is used and the following settings are applied:
- Pre test speed: 1.0 mm/s
- Test speed: 0.5 mm/s
- Post speed: 5.0 mm/s
- Rupture test speed: 1.00 mm/s
- Distance: 7.00 mm
- Force: 10 g
- Time: 5.00 seconds
- Count: 5
- Type: auto
- Trigger force: 0.5/1.0 g RheoStress RS-100 Analyses:

As soon as the sample is poured into the rheometer cup and covered with oil, a temperature sweep is initiated (cooling rate: 1° C./min, from 90 to 25° C., frequency 1 Hz, Stress 0.1-5 Pa) in order to determine gelling temperature. At the end of the temperature sweep at 25° C., gel strength (G') is measured at frequency 0.5 Hz, stress 0.1-5 Pa (depending on the sample). Finally, a stress sweep is made at 25° C. (Frequency 0.5 Hz, Stress 0.1-446 Pa). The critical stress is given as the last value of G', G" and the corresponding stress before breakdown after hardening at 25° C. for 30 minutes.

EXAMPLES

Extraction of Pectin from Peel

A range of pectin containing starting materials were extracted in order to provide material for subsequent de-esterification with conventional methods and de-esterification with biocatalysts.

Three different pectin starting materials were utilized. These were dried peel of lemon, orange, and lime. The dry matter of the starting materials were about 90-95%.

For each pectin starting material, 30 kg dried peel was added to a 1000 liter stainless steel tank containing a mixture of 3.52 liters 65% nitric acid and 931 liter ion exchanged water. The mixture was agitated while heating to 70° C. With continuing agitation, the mixture was allowed to react at 70° C. for 6 hours.

After reaction, the hot extract was sieved on a vibrating screen (Vester Åby vibrator with mesh size 0.25 mm, Denmark). Hereafter the hot extract was added 50 ml ion exchange resin per liter extract (Rohm & Haas, Amberlite SR 1 L, Germany). The ion exchange was carried out for 30 minutes while agitating, and the resulting ion exchanged extract was filtered on a rotating scraped vacuum drum filter at 70° C. Before filtering, the vacuum drum was coated by about 4 cm diatomaceous earth filter aid (Celite 545).

The filtered extract was then evaporated under vacuum to about one third volume.

This concentrated extract was used in the following examples for de-esterification.
Results:

TABLE 1

Degree of esterification, molecular weight and intrinsic viscosity of extracts used for further de-esterification

| Starting Material | DE of extract % | $M_w$ of extract Da | Intrinsic viscosity dl/g |
|---|---|---|---|
| Lemon Peel | 65.7 | 100300 | 4.267 |
| Orange Peel | 65.1 | 113800 | 3.941 |
| Lime Peel | 64.3 | 124950 | 5.003 |

After extraction, the degree of esterification ranged from about 64% to about 69% depending on the starting material used. The molecular weight showed a range from about 100000 Daltons to about 125000 Daltons for citrus fruit based starting materials.

Comparative Example 1

De-Esterification Using Acid

From the starting pectin materials, 60 liters of concentrated extract was cooled to 50° C. in a jacketed agitated stainless steel tank. 456 g 65% nitric acid was added while agitating, and the mixture allowed to react at 50° C. until a desired degree of esterification of about 40% was obtained. When this was accomplished, 30 liters of the reaction mix was precipitated in 90 liters of 80% isopropanol, washed for about 5 minutes in 60% isopropanol, pressed on a hydraulic press and about 100 g of the pressed material was used to measure dry matter, degree of esterification, molecular weight etc. The remaining pressed material was divided into two weighed portions for later amidation.

The remaining 30 liters of concentrated extract was further reacted until a degree of esterification of about 30% and then treated according to the previous sample.
Results:

TABLE 2

Change in molecular weight by acid de-esterification

| Starting Material | Degree of Esterification % | Molecular Weight Da | Delta $M_w$ % |
|---|---|---|---|
| Lemon Pectin | 39.3 | 62600 | −37.6 |
| 65.7% DE | 33.0 | 65800 | −34.4 |
| Orange Peel | 36.6 | 60100 | −47.2 |
| 65.1% DE | 28.3 | 58000 | −49.0 |
| Lime Peel | 40.0 | 73550 | −41.1 |
| 64.3% DE | 31.5 | 66500 | −46.8 |

When the starting pectin materials were used for acid de-esterification, the molecular weight of the de-esterified pectins was reduced by about 34% and 49%. Thus, when de-esterifying pectin using the conventional acid de-esterification process, the reduction in molecular weight was substantial.

Example 1

De-Esterification Using Biocatalyst

The starting pectin materials, 60 liters of concentrated extract was cooled to 45° C. in a jacketed agitated stainless steel tank. pH of the extract was adjusted to 4.5 with a 10% sodium carbonate solution. 540 Units per liter concentrated extract (method) of Rheozym (Novozyme, Denmark) was added. pH of the extract was kept constant at 4.5 by adding a 10% sodium carbonate solution. The following calculation was used to ascertain the change in the degree of esterification in the pectin that results from the amount of sodium carbonate added: $\Delta DE = (40.56541)$(grams of soda per gram of pectin)+ 3.383. When the calculated amount of sodium carbonate had been added in order to reach a degree of esterification of 40%, 30 liters of the reaction mix was transferred to another jacketed agitated stainless steel tank. pH was adjusted to 2.5 with dilute nitric acid to stop the biocatalyst reaction, and the mix was heated to 80° C. and kept at that temperature for 10 minutes in order to inactivate the biocatalyst.

The mix was cooled to below 50° C. and treated identical to the samples in Comparative Example 1.

The remaining 30 liters of concentrated extract was further reacted until a calculated degree of esterification of about 30% and then treated according to the previous sample.
Results:

TABLE 1.1

Change in molecular weight by biocatalyst de-esterification

| Starting Material | Degree of Esterification % | Molecular Weight Da | Delta $M_W$ % |
|---|---|---|---|
| Lemon Peel | 36.2 | 92200 | −8.1 |
| 65.7% DE | 28.6 | 93350 | −6.9 |
| Orange Peel | 39.9 | 101950 | −10.4 |
| 65.1% DE | 31.2 | 100550 | −11.6 |
| Lime Peel | 39.1 | 114750 | −8.2 |
| 64.3% DE | 29.8 | 108500 | −13.2 |

When the starting pectin materials were used for biocatalyst de-esterification, the molecular weight of de-esterified pectins was reduced by about 7% and 13%. Thus, the use of bio-catalysts for de-esterification of pectin resulted in much less depolymerization of the starting pectin materials.

From Comparative Example 1 and Example 1, it follows that the ratio, R, between the molecular weight of the starting pectin material and the molecular weight of de-esterified pectin material was as follows:

TABLE 1.2

Summary of changes in molecular weight

|  | Lemon | | Orange | | Lime | |
| --- | --- | --- | --- | --- | --- | --- |
| Sample | DE | R | DE | R | DE | R |
| Start | 65.7 | 1.00 | 65.1 | 1.00 | 64.3 | 1.00 |
| Acid | 39.3 | 1.60 | 36.6 | 1.89 | 40.0 | 1.70 |
|  | 33.0 | 1.52 | 28.3 | 1.96 | 31.5 | 1.88 |
| Bio | 36.2 | 1.09 | 39.9 | 1.12 | 39.1 | 1.09 |
|  | 28.6 | 1.07 | 31.2 | 1.13 | 29.8 | 1.15 |

Thus, by using biocatalyst for de-esterification, the ratio, R is increased substantially less than when de-esterification was brought about with conventional acid. In fact, whereas conventional de-esterification resulted in an increase of R from 1 to as high as 1.96, biocatalyst de-esterification resulted in an increase to only as high as 1.15.

Example 2

Amidation

The eight samples from Comparative Example 1 and Example 1 were amidated. 17 liters of 70% isopropanol was transferred into a 30 liter agitated jacketed stainless steel tank equipped with a tight lid. 6 liter 25% ammonia solution was added and the temperature brought down to 5° C. 1 kg of pressed material from Comparative Example 1 and Example 1 was added.

In each of Comparative Example 1 and Example 1, four samples were amidated. Of these, two samples were deesterified to a higher degree of esterification, and two to a lower degree of esterification.

For both the higher and the lower degree of esterification, a higher and a lower degree of amidation was desired, and to accomplish this, amidation was carried out at 5° C. for 2½ hours or for 5 hours. After the specified reaction time, the reacted pressed material was drained, washed in 20 liters of 60% isopropanol, drained again, added 20 liters of 60% isopropanol and pH was adjusted to 4.2-4.4 with diluted nitric acid and drained. Finally, this drained material was washed in 20 liters 50% isopropanol, drained, pressed and dried at 70° C. over night.

Results:
Intrinsic Viscosity

During amidation, a conformational change occurs in the pectin, which has been attributed to the degree of aggregation of the pectin. Intrinsic viscosity of a pectin is influenced by both the degree of aggregation and the molecular weight of the pectin. Since it has been found that the intrinsic viscosity of a pectin is directly related to the gel strength of gels made with that pectin, the intrinsic viscosity is the preferred parameter to track. We have therefore defined $R_2$ as the ratio between the intrinsic viscosity of the starting pectin material in table 1 and the intrinsic viscosity of the amidated pectin resulting from an amidation of said starting pectin material.

Amidation After Acid De-Esterification:

TABLE 2.1

Intrinsic viscosity of amidated pectins having been first acid de-esterified

| Peel | DE start % | DE end % | DA end % | $IV_w$ dl/g | $R_2$ |
| --- | --- | --- | --- | --- | --- |
| Lemon | 33.0 | 14.7 | 13.3 | 3.417 | 1.25 |
|  | 33.0 | 9.5 | 15.8 | 3.352 | 1.27 |
|  | 39.3 | 20.2 | 15.4 | 3.714 | 1.15 |
|  | 39.3 | 9.5 | 21.8 | 3.534 | 1.21 |
| Orange | 28.3 | 15.0 | 13.6 | 2.832 | 1.39 |
|  | 28.3 | 9.6 | 13.7 | 2.794 | 1.41 |
|  | 36.6 | 17.7 | 14.4 | 3.253 | 1.21 |
|  | 36.6 | 10.4 | 22.1 | 3.098 | 1.27 |
| Lime | 31.5 | 14.3 | 13.0 | 3.545 | 1.41 |
|  | 31.5 | 10.0 | 15.6 | 3.245 | 1.54 |
|  | 40.0 | 20.4 | 14.6 | 3.901 | 1.28 |
|  | 40.0 | 12.8 | 21.6 | 3.571 | 1.40 |

Notes to columns:
1 "Peel" denotes the pectin starting material.
2 "DE start" denotes the degree of esterification resulting from the first acid deesterification.
3 "DE end" denotes the degree of esterification after amidation.
4 "DA end" denotes the degree of amidation after amidation.
5 "Mw" denotes the molecular weight after amidation.
6 "IVw" denotes the intrinsic viscosity after amidation.

The data in table 2.1 shows the following changes in intrinsic viscosity:
Lemon: Acid de-esterification results in a decrease in intrinsic viscosity of 15-27%
Orange: Acid de-esterification results in a decrease in intrinsic viscosity of 21-41%
Lime: Acid de-esterification results in a decrease in intrinsic viscosity of 28-54%

Amidation After Biocatalytic De-Esterification:

TABLE 2.2

Intrinsic viscosity of amidated pectins having first been de-esterified with biocatalyst

| Peel | DE start % | DE end % | DA end % | $IV_w$ dl/g | $R_2$ |
| --- | --- | --- | --- | --- | --- |
| Lemon | 28.6 | 12.9 | 9.5 | 3.644 | 1.17 |
|  | 28.6 | 10.2 | 12.7 | 3.874 | 1.10 |
|  | 36.2 | 17.7 | 14.2 | 4.148 | 1.03 |
|  | 36.2 | 11.0 | 17.0 | 3.711 | 1.15 |
| Orange | 31.2 | 15.6 | 10.9 | 3.354 | 1.18 |
|  | 31.2 | 9.3 | 15.8 | 3.337 | 1.18 |
|  | 39.9 | 20.7 | 13.2 | 3.806 | 1.04 |
|  | 39.9 | 11.3 | 19.8 | 3.582 | 1.10 |
| Lime | 29.8 | 12.8 | 11.4 | 4.281 | 1.17 |
|  | 29.8 | 7.9 | 16.1 | 4.266 | 1.17 |
|  | 39.1 | 18.1 | 16.1 | 4.569 | 1.09 |
|  | 39.1 | 10.9 | 21.7 | 4.422 | 1.13 |

Notes to columns:
1 "Peel" denotes the pectin starting material.
2 "DE start" denotes the degree of esterification resulting from the biocatalyst deesterification.
3 "DE end" denotes the degree of esterification after amidation.
4 "DA end" denotes the degree of amidation after amidation.
5 "Mw" denotes the molecular weight after amidation.
6 "IVw" denotes the intrinsic viscosity after amidation.

The data in table 2.2 shows the following changes in intrinsic viscosity:
Lemon: Acid de-esterification results in a decrease in intrinsic viscosity of 3-17%
Orange: Acid de-esterification results in a decrease in intrinsic viscosity of 4-18%
Lime: Acid de-esterification results in a decrease in intrinsic viscosity of 9-17%

Rheological Measurements of Synthetic Gels
Gel strength on RheoStress RS-100

TABLE 2.3

Gel strength of amidated pectin gels at various calcium concentrations

| Peel | De-ester process | DE end % | DA end % | Gel strength at 25° C., Pa Calcium content, ppm | | | | | |
|---|---|---|---|---|---|---|---|---|---|
| | | | | 0 | 15.4 | 30.8 | 61.5 | 92.3 | 123.1 |
| Lemon | Acid | 9.5 | 21.8 | 56.4 | 111 | 153 | 399 | Pre-gel | Pre-gel |
| | Biocatalyst | 11.0 | 17.0 | 202 | 459 | 545 | 668 | 792 | 1060 |
| Orange | Acid | 17.7 | 14.4 | 0.1 | 1.19 | 16.9 | 217 | 326 | 364 |
| | Biocatalyst | 20.7 | 13.2 | 0.5 | 3.6 | 29.6 | 218 | 361 | 369 |
| Lime | Acid | 12.8 | 21.6 | 102 | 104 | 139 | 383 | 722 | 904 |
| | | 14.3 | 13.0 | 0.18 | 0.48 | 5.6 | 209 | 492 | 596 |
| | Biocatalyst | 10.9 | 21.7 | 190 | 399 | 526 | 688 | 1250 | 1010 |
| | | 12.6 | 11.4 | 0.78 | 1.97 | 18 | 275 | 892 | 927 |

FIG. 1 presents the data in table 2.3 with gel strength on the y-axis and calcium concentration along the x-axis.

When comparing each individual set of amidated pectin based on the starting material, it was noted that for each starting material, the gel strength of the amidated pectin which had been de-esterified with biocatalyst produced gels of much higher gel strength. This was particularly noticeable for the starting materials lemon and lime, whereas the effect on gel strength of biocatalyst de-esterification was less pronounced for orange.

Critical Stress on RheoStress RS-100

TABLE 2.4

Critical stress of amidated pectin gels at various calcium concentrations

| Peel | De-ester process | DE end % | DA end % | Critical stress, Pa Calcium content, ppm | | | | | |
|---|---|---|---|---|---|---|---|---|---|
| | | | | 0 | 15.4 | 30.8 | 61.5 | 92.3 | 123.1 |
| Lemon | Acid | 9.5 | 21.8 | 20.18 | 31.4 | 76.04 | 76.04 | 118.3 | 76.04 |
| | Biocatalyst | 11.0 | 17.0 | 118.3 | 286.6 | 286.6 | 286.6 | 286.6 | 118.3 |
| Orange | Acid | 17.7 | 14.4 | NG | 12.97 | 76.04 | 286.6 | 286.6 | 286.6 |
| | Biocatalyst | 20.7 | 13.2 | NG | 48.86 | 184.2 | TS | TS | TS |
| Lime | Acid | 12.8 | 21.6 | 48.86 | 48.86 | 48.86 | 76.04 | 48.86 | 76.04 |
| | | 14.3 | 13.0 | NG | NG | 31.4 | 184.2 | 286.6 | 286.6 |
| | Biocatalyst | 10.9 | 21.7 | 118.3 | 184.2 | 286.6 | 286.6 | 184.2 | 118.3 |
| | | 12.6 | 11.4 | NG | 3.44 | 76.04 | TS | TS | TS |

Note:
NG denotes that no gel was formed and thus, the sample could not be measured.
TS denotes too strong a gel and thus, outside the measuring range of the apparatus.

As for the gel strength, the critical stress was much increased when biocatalyst was used for de-esterification compared to the traditional acid de-esterification.

Break Strength on TA.XT2 Texture Analyser

TABLE 2.5

Break strength of amidated pectin gels at various calcium concentrations

| Peel | De-ester process | DE end % | DA end % | Break strength at 25° C., grams Calcium content, ppm | | | | | |
|---|---|---|---|---|---|---|---|---|---|
| | | | | 0 | 15.4 | 30.8 | 61.5 | 92.3 | 123.1 |
| Lemon | Acid | 9.5 | 21.8 | 14.10 | 5.10 | 5.50 | 7.80 | 10.20 | 8.70 |
| | Biocatalyst | 11.0 | 17.0 | 18.20 | 34.10 | 46.00 | 54.60 | 37.30 | 25.00 |
| Orange | Acid | 17.7 | 14.4 | NG | 11.70 | 13.50 | 31.30 | 42.00 | 36.40 |
| | Biocatalyst | 20.7 | 13.2 | 5.83 | 14.53 | 21.53 | 29.26 | 39.93 | 43.97 |
| Lime | Acid | 12.8 | 21.6 | 14.10 | 5.10 | 5.50 | 7.80 | 10.20 | 8.70 |
| | | 14.3 | 13.0 | — | — | 20.20 | 46.30 | 57.90 | 43.40 |
| | Biocatalyst | 10.9 | 21.7 | 18.20 | 34.10 | 46.00 | 54.60 | 37.30 | 25.00 |
| | | 12.6 | 11.4 | — | — | 32.6 | 76.20 | 101.20 | 94.40 |

Notes:
NG denotes that no gel was formed and thus, the sample could not be measured.
— denotes that no values have been generated.

For the starting materials lemon and lime, the difference in break strength was markedly different when comparing conventional de-esterification using acid with biocatalyst de-esterification. When de-esterifying with biocatalyst, the break strength of gels made with the resulting amidated pectins were much higher than the corresponding break strengths of amidated pectins made from conventional acid de-esterified starting materials. The effect was also evident for the starting material, orange.

Gel Strength on TA.XT2 Texture Analyser

TABLE 2.6

Gel strength of amidated pectin gels at various calcium concentrations

| Peel | De-ester process | DE end % | DA end % | Gel strength at 25° C., grams Calcium content, ppm | | | | | |
|---|---|---|---|---|---|---|---|---|---|
| | | | | 0 | 15.4 | 30.8 | 61.5 | 92.3 | 123.1 |
| Lemon | Acid | 9.5 | 21.8 | — | 2.30 | 5.10 | 5.40 | 6.70 | 4.60 |
| | Biocatalyst | 11.0 | 17.0 | 4.60 | 7.60 | 15.10 | 15.80 | 13.10 | 8.50 |
| Orange | Acid | 17.7 | 14.4 | — | 0.93 | 1.67 | 4.70 | 7.77 | 9.00 |
| | Biocatalyst | 20.7 | 13.2 | 0.70 | 1.07 | 1.73 | 3.57 | 5.50 | 7.40 |
| Lime | Acid | 12.8 | 21.6 | 6.80 | 2.40 | 2.40 | 4.40 | 5.10 | 4.80 |
| | | 14.3 | 13.0 | 5.20 | 9.60 | 16.20 | 18.90 | 15.70 | 12.60 |
| | Biocatalyst | 10.9 | 21.7 | — | — | 1.30 | 4.90 | 9.40 | 11.90 |
| | | 12.6 | 11.4 | — | — | 1.70 | 8.80 | 14.60 | 19.20 |

Note:
"—" denotes that no values have been generated.

The pattern was the same. Lemon and lime based amidated pectins showed a marked increase in gel strength when biocatalyst had been used to de-esterify the staring material prior to amidation. With respect to gel strength, orange starting material appeared to be unaffected by the de-esterification process before amidation.

Example 3

Effect of degree of esterification of starting material for amidation on Mark-Houwink factor and the effect in raspberry gel.

In this example, the starting material for amidation had been prepared according to Example 2. However, before amidation, the starting material had been de-esterified using a biocatalyst to a certain level.

TABLE 3.1

Mark-Houwink factor at various degrees of esterification

| Start DE, % | "a"of the resultant amidated pectin |
|---|---|
| 58 | 0.83 |
| 52 | 0.84 |
| 46 | 0.86 |
| 42 | 0.91 |
| 33 | 0.93 |
| 30 | 0.96 |

The plot shows an increase of the Mark-Houwink factor as the DE of the starting material decreased. Thus, it indicates that as the DE of the starting material before amidation was decreased, a less aggregated amidated pectin was achieved. This leads to an amidated pectin of better solubility, thus, an amidated pectin which produced stronger gels. The plot also indicates a local maximum at about 42% DE, which indicates that a particularly rod like amidated pectin was being made from such a starting material.

To further substantiate the particular advantage of using a starting material with a specific DE, raspberry jellies were made with three of the amidated pectins according to example 2.

Materials:

| Item | Content | Concentration | Provider |
|---|---|---|---|
| Solution A | Raspberry juice | 300 g/l | Rynkeby, Ringe, Denmark |
| | Sugar | 160 g/l | |
| | De-ionized water | 185 g/l | Danisco A/S, Denmark |
| | Tap water | 185 g/l | |
| Solution B | Pectin | 0.56 g/l | |
| | De-ionized water | 160 g/l | |
| Solution C | Sodium benzoate | 2 ml/kg | Merck, Darmstadt, Germany |
| | Potassium sorbate | 2 ml/kg | Merck, Darmstadt, Germany |
| Solution D | Citric acid (50% v/w) | 5 ml/kg | Merck, Darmstadt, Germany |

Balance Mettler PJ 6000 (Mettler-Toledo, Copenhagen, Denmark)
2 L pot
Electric hot plate (Blomberg)
Waring blender (Waring Products Division)
Bloom glass, Pyrex
TA.TXT2

Method

Raspberry juice, sugar and water (solution A) were mixed. The preparation was boiled until all sugar had dissolved. Pectin was dissolved in hot water (90° C.) (solution B), using a Warring blender on high shear. The pectin (B) was then added to solution A, while the preparation was continuously stirred. After addition of the pectin solution, the preparation was boiled for approx. 2 min., while stirring. Water was then added until 1000 g net weight. Preservatives (solution C) were then added. Finally citric acid (solution D) was added. Then again net weight was adjusted with water to 1000 g. The preparation was filled into bloom glasses and left overnight at 25° C., then gel and break strength were determined, together with distance to break using TA.TXT2 analyser.

TA.XT2 Analyses:

A plunger of ½ inch was used and the following program was applied: pre-test speed 2.0 mm/s, test speed 0.5 mm/s, post speed 10.0 mm/s, rupture test speed 1.00 mm, distance 24.00 mm, force 40 g, time 0.09 sec., count 5, type auto, trigger force 2.5 g.

TABLE 3.2

Break strength of amidated pectin gels

| Start DE, % | Break strength, grams | Evaluation of Gels |
|---|---|---|
| 58 | 337 | Softest Gel, acceptable. No pregellation |
| 42 | 813 | Strongest Gel. No pregellation |
| 30 | 769 | Strong Gel,. Pregellation indicated. |

Thus, particularly soluble and thus strong gel producing amidated pectins were prepared from starting materials that had been de-esterified with biocatalyst to a degree of esterification ranging from about 30% to about 45%.

Example 4

Effect of Degree of Esterification of Starting Material for Amidation on Mark-Houwink Factor and the Effect in Synthetic Gel In this example, the starting material for amidation had been prepared according to example 2. However, before amidation, the starting material had been de-esterified to a certain level according to Table 3.1 using a biocatalyst.

In addition, the pectins have been used to make synthetic gels according to the method described previously (Rheological measurements of synthetic gels).

Two different starting pectins were used. In test No. 1, the starting pectin had a higher molecular weight than the starting pectin in test No. 2:

TABLE 4.1

Molecular weight and intrinsic viscosity of de-esterified pectins before amidation

| Test No. | Start DE, % | Molecular Weight Daltons |
|---|---|---|
| 1 | 46 | 152100 |
|   | 38 | 149550 |
|   | 34 | 156500 |
| 2 | 61 | 110950 |
|   | 49 | 121050 |
|   | 36 | 113650 |

TABLE 4.2

Two amidated pectins made on different starting materials and the effect of starting DE on Mark-Houwink factor and gel strength

| Test No. | Start DE, % | a | Final DE % | Final DA % | Gel strength at 25° C., Pa Calcium content, ppm | | |
|---|---|---|---|---|---|---|---|
|   |   |   |   |   | 61.5 | 92.3 | 123.1 |
| 1 | 46 | 0.794 | 21.1 | 18.4 | 356 | 475 | 577 |
|   | 38 | 0.815 | 10.8 | 19.2 | 951 | 1540 | 1910 |
|   | 34 | 0.831 | 9.2 | 17.6 | 1460 | 2090 | 2530 |

TABLE 4.2-continued

Two amidated pectins made on different starting materials and the effect of starting DE on Mark-Houwink factor and gel strength

| Test No. | Start DE, % | a | Final DE % | Final DA % | Gel strength at 25° C., Pa Calcium content, ppm | | |
|---|---|---|---|---|---|---|---|
|   |   |   |   |   | 61.5 | 92.3 | 123.1 |
| 2 | 61 | 0.857 | 26.5 | 21.5 | 98 | 97 | 64 |
|   | 49 | 0.872 | 21.0 | 19.3 | 315 | 468 | 497 |
|   | 36 | 0.933 | 10.0 | 16.7 | 927 | 1530 | 1680 |

The results of tests Nos. 1 and 2 are as follows:

In test No. 1, while the individual samples amidated pectin were similar in molecular weight and degree of amidation, the gel strengths of these amidated pectins were not as comparable, as can be seen in table 4.2. The results demonstrate that the degree of esterification of the de-esterified pectin before amidation ultimately has an effect on the gel strength of the resultant amidated pectin. Without being bound by theory, conformational changes in amidated pectins, as indicated by the increasing Mark Houwink factor, "a", result in amidated pectins exhibiting improved gel strengths. Thus, table 4.2 indicates that the use of a bio-catalyst to de-esterify a starting pectin material prior to amidation, results in an amidated pectin with increased gel strength.

In test No. 2, the same phenomenon as test No. 1 is also demonstrated. However test No. 2 additionally demonstrates that the degree of esterification of the bio-catalyst de-esterified pectin is preferably below 60% in order for the resulting amidated pectin to exhibit significantly increased gel strengths when compared to pectins de-esterified using acid.

Figure 7:
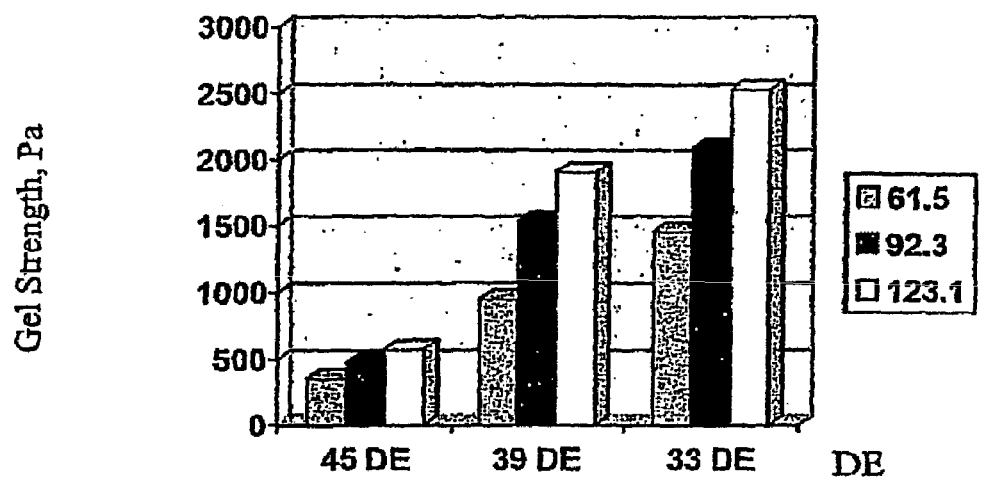
FIG. 7 plots data from table 4.1 relating to test No. 1 and shows gel strength of amidated pectin made from starting pectin material at different DE. For each starting pectin DE, the plot also shows how the gel strength is influenced by various calcium ion concentrations.
Figure 8:
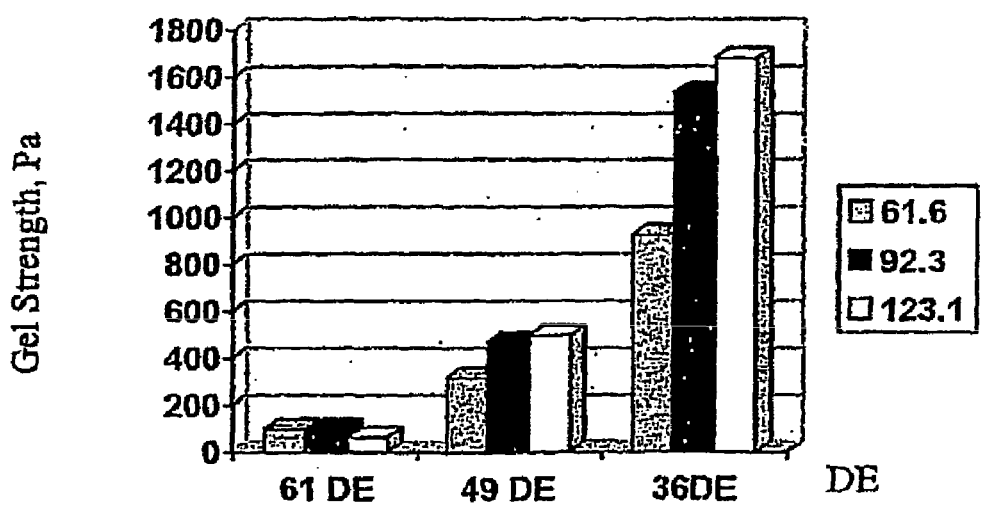
FIG. 8 plots data from table 4.1 relating to test No. 2 and shows gel strength of amidated pectin made from starting pectin material at different DE. For each starting pectin DE, the plot also shows how the gel strength is influenced by various calcium ion concentrations.

The value of decreasing the degree of esterification of the starting material to below 60% before amidation in order to increase the gel strength is substantiated in FIG. 7 and FIG. 8.

It is noted that the foregoing examples have been provided merely for the purpose of explanation and are in no way to be construed as limiting of the present invention. While the present invention has been described with reference to an exemplary embodiment, it is understood that the words that have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

The invention claimed is:

1. An amidated pectin prepared by a process comprising:
   contacting a starting pectin material with a pectin methyl esterase capable of de-esterifying the starting pectin material to produce a de-esterified pectin,
   monitoring the de-esterification of the starting pectin material and terminating the de-esterification when the de-esterified pectin has a degree of esterification ranging from 60% to 30%, wherein the de-esterified pectin has a molecular weight greater than the molecular weight of a de-esterified pectin prepared by acid or alkali hydrolysis of the starting pectin material and wherein the de-esterified pectin is characterized by a ratio, R, of the molecular weight of the starting pectin material to the molecular weight of the de-esterified pectin, of up to 1.15, and contacting the de-esterified pectin with ammonia to produce an amidated pectin,
wherein the amidated pectin is characterized by having a ratio, R2, of intrinsic viscosity of the de-esterified pectin material to the intrinsic viscosity of the amidated de-esterified pectin ranging from 1.01 to 1.15.

2. The amidated pectin of claim 1, wherein the ratio, R2 ranges from 1.03 to 1.15.

3. The amidated pectin of claim 1, wherein the ratio, R2, ranges from 1.04 to 1.15.

4. The amidated pectin of claim 1, characterized by having a degree of esterification of 30% or less and a degree of amidation of 18% or less.

5. The amidated pectin of claim 1, characterized by having a degree of esterification of 10-20% and a degree of amidation of 10-20%.

6. The amidated pectin of claim 1, characterized by having a degree of esterification of 12-18% and a degree of amidation of 5-30%.

7. The amidated pectin of claim 1, characterized by displaying a Mark-Houwink factor, "a", above 0.8.

8. The amidated pectin of claim 1, characterized by displaying a Mark-Houwink factor, "a", in the range 0.8-1.0.

9. The amidated pectin of claim 1, characterized by displaying a Mark-Houwink factor, "a", in the range 0.85-0.95.

10. The amidated pectin of claim 1, wherein the pectin methyl esterase de-esterifies in a random way.

11. The amidated pectin of claim 1, characterized by forming gels having a gel strength, critical stress, and break strength greater than that of an amidated pectin derived from a de-esterified pectin prepared by acid or alkali hydrolysis of the starting pectin material.

12. An amidated pectin obtained from amidating a de-esterified pectin having a degree of esterification ranging from 60% to 30% and a molecular weight greater than the molecular weight of a de-esterified pectin prepared by acid hydrolysis or alkali hydrolysis, wherein the de-esterified pectin is characterized by having a ratio, R, of the molecular weight of the starting pectin material to the molecular weight of the de-esterified pectin of up to 1.15, and wherein the amidated pectin is characterized by having a ratio, R2, of intrinsic viscosity of the de-esterified pectin material to the intrinsic viscosity of the amidated de-esterified pectin ranging from 1.01 to 1.15.

13. The amidated pectin of claim 12, wherein the ratio, R2, ranges from 1.03 to 1.15.

14. The amidated pectin of claim 12, wherein the ratio, R2, ranges from 1.04 to 1.15.

15. The amidated pectin of claim 12, characterized by having a degree of esterification of 30% or less and a degree of amidation of 18% or less.

16. The amidated pectin of claim 12, characterized by having a degree of esterification of 10-20% and a degree of amidation of 10-20%.

17. The amidated pectin of claim 12, characterized by having a degree of esterification of 12-18% and a degree of amidation of 5-30%.

18. The amidated pectin of claim 12, characterized by displaying a Mark-Houwink factor, "a", above 0.8.

19. The amidated pectin of claim 12, characterized by displaying a Mark-Houwink factor, "a", in the range 0.8-1.0.

20. The amidated pectin of claim 12, characterized by displaying a Mark-Houwink factor, "a", in the range 0.85-0.95.

21. A foodstuff comprising an amidated pectin according to claim 1.

22. The foodstuff of claim 21, wherein the foodstuff is a jam or jelly.

23. The foodstuff of claim 21, wherein the foodstuff is a dairy product.

* * * * *